(12) United States Patent
King et al.

(10) Patent No.: US 12,714,955 B2
(45) Date of Patent: Aug. 25, 2026

(54) DISPENSER

(71) Applicant: King Technology, Inc., Minnetonka, MN (US)

(72) Inventors: Joseph King, Wayzata, MN (US); Jeffrey Johnson, Edina, MN (US); Paul Freeberg, South St. Paul, MN (US); David Guy, Maple Grove, MN (US); Terry Goeman, Minnetonka, MN (US); Lyle Enderson, Anoka, MN (US); Randy Roseth, Chanhassen, MN (US)

(73) Assignee: King Technology, Inc., Minnetonka, MN (US)

( * ) Notice: Subject to any disclaimer, the term of this patent is extended or adjusted under 35 U.S.C. 154(b) by 389 days.

(21) Appl. No.: 17/300,484

(22) Filed: Jul. 14, 2021

(65) Prior Publication Data

US 2022/0016548 A1 Jan. 20, 2022

Related U.S. Application Data

(62) Division of application No. 16/018,951, filed on Jun. 26, 2018, now Pat. No. 11,141,685.

(Continued)

(51) Int. Cl.

*B01D 29/31* (2006.01)
*B01D 24/16* (2006.01)

(Continued)

(52) U.S. Cl.

CPC ............ *B01D 29/31* (2013.01); *B01D 24/16* (2013.01); *B01F 21/221* (2022.01);

(Continued)

(58) Field of Classification Search

CPC ....... B01D 29/31; B01D 24/16; B01F 21/221; B07B 1/4681; C02F 1/001; C02F 1/50;

(Continued)

(56) References Cited

U.S. PATENT DOCUMENTS 3,495,948 A * 2/1970 Alfred .................... C02F 1/688 422/282
6,099,735 A * 8/2000 Kelada .................... C02F 1/441 210/257.2

(Continued)

FOREIGN PATENT DOCUMENTS

CN 206188543 U * 5/2017

OTHER PUBLICATIONS

3M ACTISORB Silver (Year: 2013).*
Grijseels (Pharmaceutish Weekblad Scientific Edition, vol. 3, 1981, pp. 129-144) (Year: 1981).*

*Primary Examiner* — Patrick Orme
*Assistant Examiner* — Boi-Lien Thi Nguyen
(74) *Attorney, Agent, or Firm* — Fredrikson & Byron, P.A.

(57) ABSTRACT

A system, a cartridge and a dispensing valve for eliminating a drift or sag in BCDMH output from an inline dispensing valve containing a dispensing cartridge mountable within the inline dispensing valve with the dispensing cartridge containing a batch of water erodible cluster inhibiting BCDMH particles to provide a linear output flow of BCDMH which is responsive to flow of water though a cartridge in the dispensing valve and a method of obtaining a linear output in a dispensing system by increasing the size of particles in a dispensing cartridge in the system.

19 Claims, 2 Drawing Sheets

Related U.S. Application Data

(60) Provisional application No. 62/604,960, filed on Jul. 27, 2017.

(51) Int. Cl.

| | |
|---|---|
| ***B01F 21/20*** | (2022.01) |
| ***B07B 1/46*** | (2006.01) |
| ***C02F 1/00*** | (2023.01) |
| ***C02F 1/50*** | (2023.01) |
| ***C02F 1/68*** | (2023.01) |
| ***C02F 103/02*** | (2006.01) |

(52) U.S. Cl.

CPC ............ *B07B 1/4681* (2013.01); *C02F 1/001* (2013.01); *C02F 1/50* (2013.01); *C02F 1/688* (2013.01); *C02F 2103/023* (2013.01); *C02F 2201/006* (2013.01); *C02F 2209/40* (2013.01); *C02F 2303/04* (2013.01)

(58) Field of Classification Search

CPC ................ C02F 1/688; C02F 2103/023; C02F 2201/006; C02F 2209/40; C02F 2303/04

See application file for complete search history.

(56) References Cited

U.S. PATENT DOCUMENTS

| | | | | |
|---|---|---|---|---|
| 6,610,199 | B2 * | 8/2003 | Bittner | C02F 1/688 210/232 |
| 6,706,395 | B2 | 3/2004 | Harrison et al. | |
| 8,444,118 | B1 | 5/2013 | Dumler et al. | |
| 8,492,419 | B2 * | 7/2013 | Feldman | B01F 21/10 424/661 |
| 8,644,743 | B2 | 2/2014 | Ruiz et al. | |
| 9,707,520 | B2 * | 7/2017 | Denvir | C02F 1/68 |
| 10,286,365 | B2 * | 5/2019 | Guy | B01F 21/22 |
| 2003/0077365 | A1 * | 4/2003 | Howarth | A23L 3/3463 426/332 |
| 2013/0213888 | A1 * | 8/2013 | Tempest, Jr. | C02F 9/00 210/639 |

* cited by examiner 10
11
11a
9
14
12
14b
14a
14f
130
131
32
$H_2O$
15
16
13

50
14e
20c
20
18
21
18b
14
20d
18d
19
18a
20b
20a
14d
14c
14b
14a
14f

BCDMH
BCDMH Output Rate
40
41
Main Line Flow Rate
(gpm)

30
31
36
33b
33d
33
31a
33a
19
34
39

50
50d
30
14J
21
14
19
34
39
14d
14c
14b
14a
14f

DISPENSER

CROSS REFERENCE TO RELATED APPLICATIONS

This application is a division application of application Ser. No. 16/018,951 filed Jun. 26, 2018 (pending), which claims benefit of provisional application 62/604,960 filed Jul. 27, 2017.

STATEMENT REGARDING FEDERALLY SPONSORED RESEARCH OR DEVELOPMENT

None

REFERENCE TO A MICROFICHE APPENDIX

None

BACKGROUND OF THE INVENTION

Harmful organisms that are found in cooling tower water as well as other water-cooled equipment must be regularly killed in order to protect the system and the people that come into contact with the water. It has been found that one of the hydantoins that provides good efficacy in ridding water-cooled equipment of harmful organisms is 1-bromo-3-chloro-5,5-dimethylhydantoin (hereinafter BCDMH).

To kill the harmful organisms in a water reservoir numerous types of antimicrobial agents or combinations of antimicrobial agents have been used in a variety of forms including a powder, a liquid, a slurry, a granular or a tablet form. The antimicrobial agents are only effective in killing the organisms if the antimicrobial agent can be delivered in proper amounts and at proper times to the water that contains the harmful organisms. That is, sufficient antimicrobial agents must be delivered at a sufficient rate to quickly and effectively kill the harmful organisms in a water reservoir based on the level of harmful organisms in the water in the reservoir. One such need to quickly and continually kill harmful organisms is in the water reservoirs found in cooling towers, which are typically found in commercial buildings. Typically, environmental conditions are such that the harmful organisms can rapidly increase in a cooling tower water reservoir.

One of the methods of incorporating antimicrobial agents into a body water to kill harmful organisms is to mix the antimicrobial agents with water and create a slurry before delivering the slurry to the body of water. Another method is to continually or periodically deliver a antimicrobial agent to the body of water with the antimicrobial agent held in tablet form within an inline dispenser. In another method BCDMH in particle form comes into direct contact with water flowing through an inline dispenser. In general, the method of flowing water through an inline dispenser canister or cartridge that contains BCDMH in order to deliver BCDMH to a body of water is both a convenient and an effective method that avoids an operator having to come into contact with the BCDMH.

One of the drawbacks of delivery of BCDMH through an inline dispensing valve is that the inline dispensing valve is usually remote from the source of harmful organisms. Also at times a low output rate of BCDMH may be required and at other times a high output rate of BCDMH may be required in order to keep the water in a system, such as a cooling tower reservoir, free of harmful organisms. Typically, when BCDMH is used in a dispensing valve the dispensing rate of BCDMH is calibrated to a water setting on the dispensing valve so that the BCDMH output rate can be increased or decreased by changing the water selection setting on the dispensing valve. However, it has been found that in some instances the BCDMH output may sag or drift from the original setting, which results in inadequate killing of harmful organisms.

It is generally believed that the use of a batch of small size BCDMH particles provides greater surface area and therefore faster dissolution and faster delivery of BCDMH. This point is borne out by U.S. Pat. No. 6,706,395 that discloses the use of a powdered halogenated hydantoin, such as BCDMH, for water treatment in a paper mill in order to obtain a fast release of the BCDMH. The patent points out that BCDMH is effective in killing harmful organisms but it also points out that one needs a rapid dissolution rate of BCDMH in order to kill the harmful organisms. U.S. Pat. No. 6,706,395 goes on to state, "Because the dissolution rate is directly proportional to the surface area of the particles, rapid dissolution is best achieved with small particles". To affirm the need for smaller particles the examples in U.S. Pat. No. 6,706,395 point out the need for small particles and recommend a particle size distribution where "70-100% particles sized between 80 mesh and 200 mesh" "0-20% of particles sized larger than 80 mesh" and 0-10% of particle smaller than 200 mesh".

U.S. Pat. No. 6,706,395 goes on to point out the difficulties in the handling and delivery of BCDMH, for example BCDMH does not flow well if applied in powder form in a water environment, which can lead to inconsistent delivery rates of BCDMH to the body of water and ineffective killing of harmful organisms in the body of water. U.S. Pat. No. 6,706,395 also points out that to obtain a fast dissolution it is necessary to have particles "small enough to provide rapid dissolution in water or other aqueous solutions" and then points that to obtain fast delivery of small size BCDMH particles the BCDMH particles should be incorporated into a slurry that is delivered to the water being where the harmful organisms are being destroyed.

SUMMARY OF THE INVENTION

A system, a cartridge and a dispensing valve for eliminating a drift or sag in BCDMH output from an inline dispensing valve containing a dispensing cartridge mountable within the inline dispensing valve with the dispensing cartridge containing a batch of cluster inhibiting BCDMH particles, which are water erodible. In use water flows into a first lower end of the cartridge and into contact with the batch of cluster inhibiting BCDMH particles therein before flowing out a second lower end of the cartridge and into the reservoir where the harmful organism originate. It has been found that if one uses a batch of cluster inhibiting BCDMH particles, which are water erodible and located within the dispensing valve, one can provide a linear output flow of BCDMH which is responsive to flow of water though a cartridge in the dispensing valve.

DESCRIPTION OF THE PREFERRED EMBODIMENT

Figures 1, 2, 3:
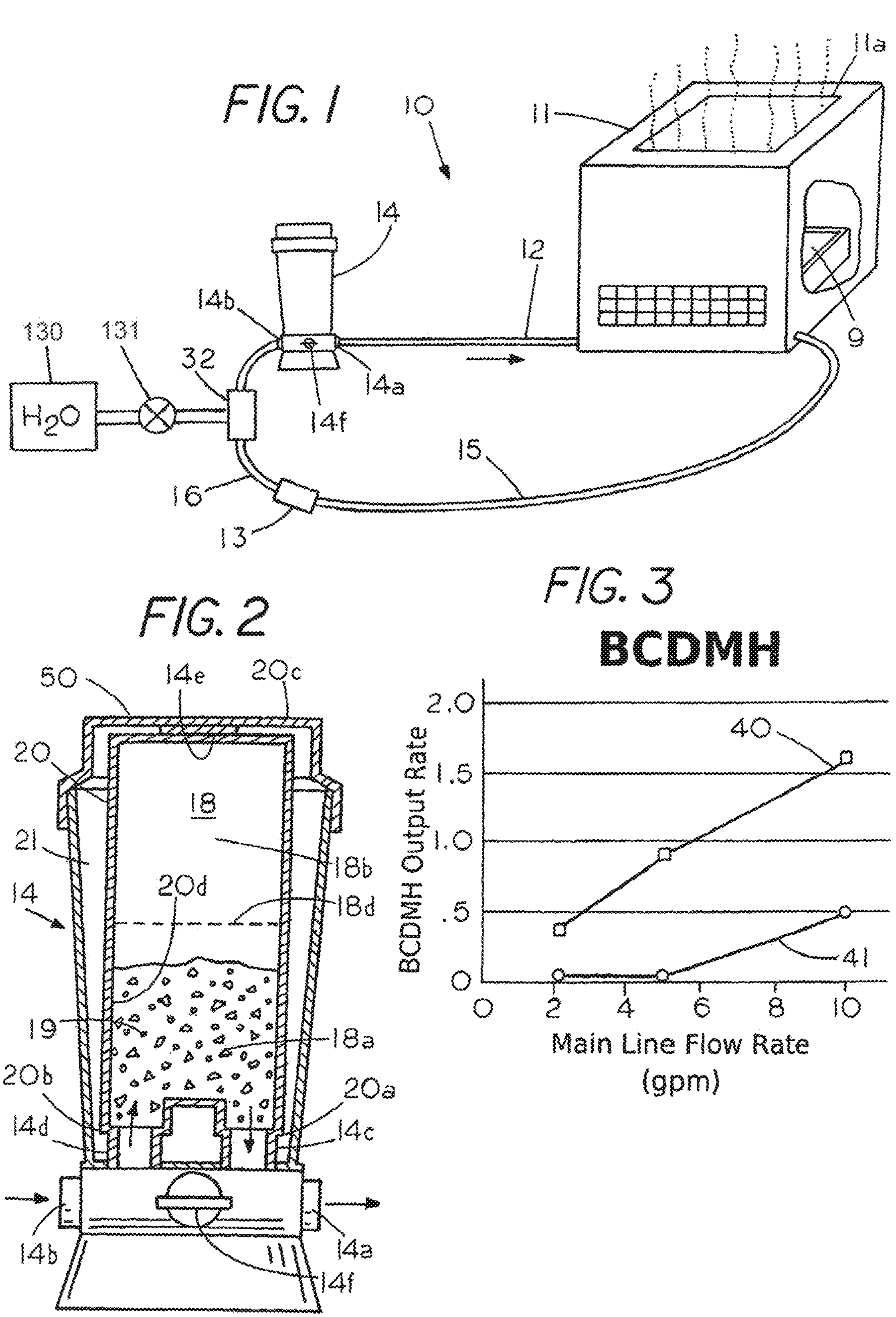
FIG. 1 shows a recirculating water system with an inline dispenser for maintaining cooling tower water free of harmful organisms.
FIG. 2 is an inline dispenser valve in section revealing a cartridge therein containing an antimicrobial agents such as BCDMH in particle form.
FIG. 3 shows the BCDMH output rate as a function of water flow rate though the inline dispensing valve of FIG. 2 with two different batches of BCDMH particles.

FIG. 1 shows a recirculating water system 10 for maintaining water from a cooling tower 11 free of harmful organisms through circulation of cooling tower water through an inline dispensing valve 14. In this example a first pipeline 15 connects to one side of cooling tower 11 and a second pipeline 12 directs cooling tower water into the cooling tower 11. As illustrated, pump 13 directs water through pipe 16 and tee 32, where additional water may be added to the system through opening valve 131, which allows water to enter pipe 16 through tee 32. The cooling tower water then flows into a water inlet 14*b* on one side of inline dispensing valve 14 and through a batch of cluster inhibiting BCDMH particles in the inline dispensing valve 14 in order to kill harmful organisms in the cooling system water. An example of a typical inline dispensing valve is shown in King U.S. Pat. No. 8,644,743, which is herby hereby incorporated by reference.

In one type of system the change in the BCDMH delivery rate into the water reservoir is obtained through manually changing the water flow rates through a flow selector located on an inline dispensing valve. In other types of systems the change in the water flow rate through the dispensing valve may be automated. However, in either case one of the objects is to maintain consistent, repeatable delivery rates of BCDMH to the water system based on water flow rates through the dispensing valve. That is, in system operation the demand for BCDMH may have to be increased or decreased in response to the level of harmful organisms in the water reservoir of the cooling tower. Since the rate of delivery of BCDMH is increased or decreased through increasing or decreasing the flow rate of water through the inline dispensing valve it is important that that the system remains in calibration so that the BCDMH output rate of the inline dispenser is repeatable. That is, if the amount of water flowing through the inline dispensing valve is increased or decreased the output of BCDMH flowing out of the dispensing valve should change accordingly and preferably linearly. For example, in order to prevent water in the reservoir from causing harm to those in proximity of the water reservoir requires that at certain times the inline dispensing valve must be set to quickly release BCDMH into the cooling tower water and at other times the dispensing valve may be set for a slower release of BCDMH into the water. Typically, the change in the release rate of BCDMH into the body of water in the reservoir is based on the increase or decrease of the water flow rate through the dispensing valve and not on a direct measurement of BCDMH in, the water. One of the difficulties with use of BCDMH particles is that the BCDMH release rate into the body of water may sag or drift from an initial release rate even though the water flow rate through the dispensing valve has not changed. However, it has been found that with a cluster-inhibiting batch of BCDMH particles, as described herein, the release rate of BCDMH into the body of water as a function of the water flow rate through the inline dispensing valve can be maintained thereby ensuring that the proper amount of BCDMH is delivered to the body of water.

Another need of a dispenser for water system, such as a cooling tower water system, is the ability of the dispenser to quickly release BCDMH into a water reservoir in the event there is an increase in harmful organisms in the water reservoir. While the use of small BCDMH particles as opposed to large BCDMH particles would appear to provide greater surface area for water contact in the dispensing valve and therefore would appear to provide for quicker release of BCDMH into the cooling tower water it has been found that small BCDMH particles can adversely limit the delivery rate of BCDMH from the dispensing valve. More specifically, it has been found that although the same mass of a batch of small BCDMH particles provide greater surface area than the same mass of a batch of large BCDMH particles the output rate of the batch of small BCDMH particles is less than the output rate with the large BCDMH particles. Also a release rate of BCDMH from a batch of small BCDMH particles tends to be erratic while the release rate of a batch of large BCDMH particles is stable. The large BCDMH particles are identified and referred herein as cluster inhibiting BCDMH particles since the BCDMH particles remain flowable and do not cluster within the cartridge in the inline dispensing valve to cause an erratic release of BCDMH or a limited release of BCDMH into the cooling water.

The use of small BCDMH particles, (i.e., particles that cluster), which results in sag or drift in output, has the further disadvantage of requiring repeated adjustment or recalibration of the water flow rate through the dispenser in order to maintain the proper BCDMH release rate from the dispenser if a spent cartridge is replaced with a fresh cartridge.

In operation of the invention described herein and shown in FIG. 1, water from a cooling tower 11 is continually circulated through the inline dispensing valve 14 to rid the cooling tower water of harmful organisms through use of a batch of cluster-inhibiting BCDMH particles located in the dispensing valve 14. An example of a cooling tower with a circulating fluid system is shown in U.S. Pat. No. 8,444,118 and is hereby incorporated by reference. In the system described herein, the harmful organism load on the cooling system 10 is controlled through a controlled release of BCDMH into the cooling system from the dispensing valve 14.

Figures 4, 5:
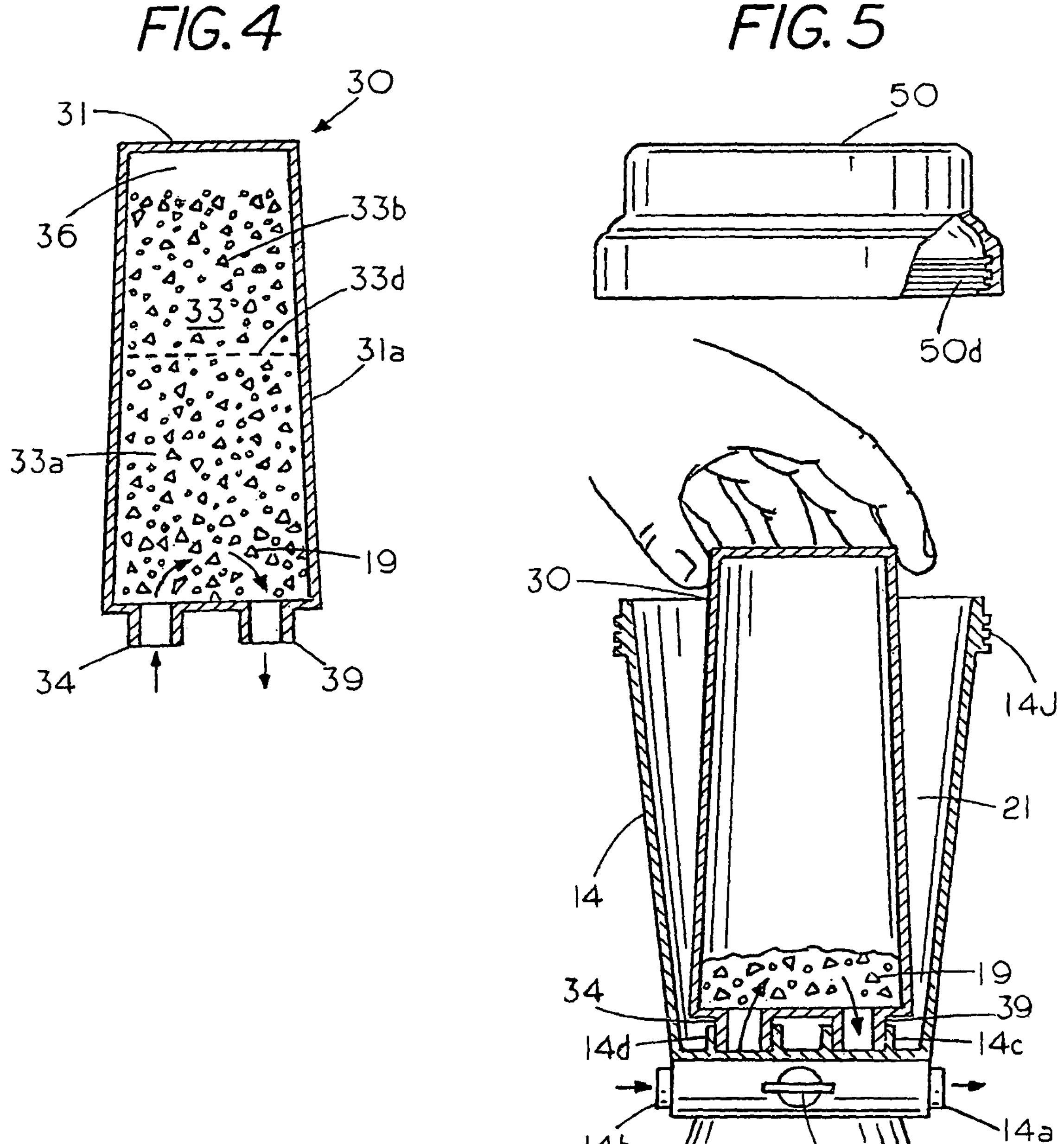
FIG. 4 shows a sectional view of a downward diverging water purification cartridge containing a batch of large BCDMH particles.
FIG. 5 shows an operator placing a fresh water purification cartridge into an inline dispensing valve after having removed the cover and withdrawn a spent water purification cartridge.

FIG. 1 shows a cooling tower water purification system 10 including a flow controllable dispensing valve 14 wherein water from water source 130 is periodically added to the water purification system 10 through a valve 131 as cooling tower water 9 recirculates to and from a cooling tower 11 through the flow controllable dispensing valve 14, which is shown in section view in FIG. 2 and FIG. 5. The flow controllable dispensing valve 14 contains a threaded cover 50 containing female threads 50*d* for engaging male threads 14*j* on valve so cover 50 can be removed to expose a cartridge chamber 21 therein that contains a first replaceable water purification cartridge 20 or 30 therein. FIG. 2 shows dispensing valve 14 having a closed top 20*c* and an antimicrobial dispersant chamber 18 with an antimicrobial agent 19 therein with a top portion of chamber 18*b* and a bottom portion of chamber 18*a* separated by line 18*d*. Cartridge 20 can be inserted into or removed from the cartridge chamber 21 in flow controllable dispensing valve 14 by grasping on the top end of the cartridge 20 as shown with cartridge 30 in FIG. 5. When cartridge 20 or cartridge 30 is located in the dispensing valve 14, a bottom water inlet 34 in the water purification cartridge receives a stream of water from a dispensing valve port 14*d* (FIG. 2, FIG. 5) and streams water with added antimicrobial agent out dispensing valve port 14*c*. In the example of FIG. 2, the bottom water outlet 20*a* in the water purification cartridge 20 directs the stream of water from the dispensing valve 14 out of the dispensing valve 14 though port 14*c*. The stream of water carries an antimicrobial agent comprising a batch of cluster inhibiting BCDMH particles 19. In one example, at least 93 percent by weight of the BCDMH particles in the batch of cluster inhibiting BCDMH particles are sufficiently large so as not pass through a 20 mesh screen. Similarly, in the example of FIG. 5, the bottom water outlet 39 in the water purification cartridge 30 directs the stream of water from the dispensing valve 14 out of the dispensing valve 14 through port 14*c*.

In the example shown in FIG. 1 the evaporative cooling and water purification system 10 includes an evaporator 11 having a water inlet 12 for cooling water, a water outlet 15 and a water vapor vent 11*a* that allows water vapor to escape to the atmosphere. Attached to the system 10 is an inline dispenser 14 (see FIG. 2, 5) having a cartridge chamber 21, an outlet 14*a* in fluid communication with the water inlet 12 in the evaporator 11, an inlet 14*b* in fluid commination with the water outlet 15 of the evaporator and a manual hand operable selector valve 14*f* for controlling a flow rate of a stream of water flowing through the inline dispenser.

FIG. 2 shows a first replaceable cartridge 20 with a dispersant chamber 18 located in the cartridge chamber 21 of inline dispenser 14 and FIG. 5 shows a replaceable cartridge 30 located in inline dispenser 14. In this example, replaceable cartridge 20 has a first bottom extension port 20*b* mateable with a base port 14*d* in the inline dispenser 14, a second bottom extension port 20*a* mateable with a base port 14*c* in the inline dispenser 14, a closed top 20*c* and a sidewall 20*d* extending from closed top 20*c* to a bottom of dispersant chamber 18. FIG. 3 and FIG. 4 show a similar cartridge except cartridge 30 contains a downwardly diverging sidewall 31*a*. While the sidewall of cartridge 20 is straight, the diverging sidewall of cartridge 30 further ensures that the BCDMH particles 19 therein are free to fall from a top portion 33*b* of the chamber 33 to a bottom portion 33 of chamber 33 (FIG. 4). An example of a cartridge with a downward diverging sidewall can be found in U.S. application Ser. No. 15/530,222 filed Dec. 13, 2016 and is hereby incorporated by reference. As can be seen in FIG. 2, FIG. 3 and FIG. 4, the replaceable cartridges contain a batch of granular BCDMH particles with the batch of granular BCDMH particles 19 in fluid contact with stream of water flowing through the cartridge. For example, with cartridge 20 water flows into the first bottom extension 20*b* of the replaceable cartridge 20 and out of the second bottom extension 20*a* of the replaceable cartridge. In this type of system, an increase in a flow rate of the stream of water through the cartridge correspondingly increases the rate of release of BCDMH from the inline dispenser 14 and a decrease in the flow rate of the stream of water through the cartridge correspondingly decreases the rate of release of BCDMH from the inline dispenser 14.

FIG. 3 shows a BCDMH output curve 40 where the BCDMH output rate is in pounds per day from the BCDMH particles as a function of flow through the inline dispensing valve 14. In the example shown the batch of BCDMH particles are sufficiently large so as not to pass through a 20 mesh screen. FIG. 3 shows that a linear increase in the flow rate of water through the inline dispenser 14 produces a linear increase (line 40) in the rate of release of BCDMH from the inline dispenser 14 thus making the system suitable for use where the amount of BCDMH needs to be increased or decreased from time to time in order to handle a fluctuating microbial load in the cooling tower water.

The system 10 produces a linear output as shown in FIG. 2 line 40 when the BCDMH particle size is such that the particles would not pass through a 20 mesh screen, however, it has also been found the system can tolerate small amounts of BCDMH particles that would fall through a 20 mesh screen. For example, it has been found that a cooling and water purification system of wherein less than 8% of the granular BCDMH particles will pass through a 20-mesh screen allows one to obtain a linear output as represented by line 40 in FIG. 3. Thus a feature of the evaporative cooling and water purification system described herein is to have a system with a linear output and repeatable control of the amount of BCDMH delivered into the water flowing through the system. The linear output can be obtained by using cluster inhibiting BCDMH particles, with cluster inhibiting particles dependent on the size of the particles. That is, the use of small BCDMH particles tend to cluster within the cartridge 30 and produce an erratic output 41 as shown in FIG. 3. The minimum size of BCDMH particles that do not cluster and remain flowable in the cartridge can be experimentally determined by using a screen to remove the smaller particles and testing the remaining particle by placing them in a water purification cartage in the inline dispensing valve 14. If the BCDMH output is linear with increased flow, the BCDMH particle is of proper size; if the output of BCDMH is not linear, the minimum size of the particles needs to be increased.

Although a 20 mesh screen has been used to establish a minimum particle size that produces a linear output, other size mesh screens may be used to establish particle size or sizes that provide a linear output of BCDMH in regard to a linear increase of water flowing through the dispenser. Still other methods may also be considered to determine a minimum particle size that does not cluster and remains flowable within the cartridge, for example measuring an angle of repose of a pile of wetted BCDMH particles to determine if the angle of repose remains stable when wetted particles are added may be an indication that the particles do not cluster and would remain flowable in a dispensing valve cartridge. However, the direct method and preferred method to determine if the particles do not cluster is to check the output of the dispenser valve that contains BCDMH particles. If the output is nonlinear, as shown by line 41 in FIG. 3, one needs to increase the size of the BCDMH particles until a linear output is obtained as indicated by line 40 in FIG. 3.

As taught herein BCDMH particles that would not pass through a 20 mesh screen provide a linear output when placed in the cartridge 20 or cartridge 30, which is then placed in a dispensing valve 14. Since the type and structure of the cartridge may have an effect on whether the particles cluster one should check the output of the dispenser with a test batch. If the dispenser output is non linear the minimum BCDMH particle size used should be increased. On the other hand if the dispensing valve output is linear the BCDMH particle size is suitable.

FIG. 2 is a cross sectional view of an inline dispensing valve 14 revealing a cartridge 20 with a chamber 18 containing a water dispensable antimicrobial agent 19 comprising a cluster inhibiting batch of BCDMH particles 19 that can fall or flow from chamber top 18*b* to chamber bottom 18*a* of the cartridge as BCDMH is removed from the bottom portion 18*a* of the cartridge 20 through water flow therethrough. In this example, the cartridge 20 has a water inlet 20*b* that connects to dispenser valve inlet 14*b* and a water outlet 20*a* that connects to dispenser valve outlet 14*a*. As the cooling tower water circulates to and from the cooling tower 11, the cooling tower water comes into direct contact with the batch of cluster inhibiting BCDMH particles 19 in cartridge 20. Cartridge 20 is maintained in a fixed position in dispenser chamber 21 with the inlet and outlet of the cartridge in fluid communication with the outlet and inlet of the dispensing valve 14 through engagement with the underside 14*e* of cover 50. In this example, water enters port 14*b* of valve 14 and discharges through port 14*a* with the amount of water directed through the cartridge 20 controlled by a manual deflector valve 14*f* that can be rotated in one direction to increase water flow through the cartridge 20 to increase the BCDMH output of the dispensing valve 14 or rotated in the opposite direction to decrease the water flow through the cartridge 21 and thus decrease the BCDMH output of the dispensing valve 14. An example of such a dispensing valve is shown in King U.S. Pat. No. 8,644,743.

FIG. 3 is a graph of the BCDMH output of the dispensing valve 14 as a function of water flow in gallons per minute (gpm) through the dispensing valve 14 when BCDMH particles are located in the dispensing valve 14. Numeral 40 identifies the BCDMH output rate when a first batch of cluster inhibiting BCDMH particles is located in cartridge 20 as water flows through the dispensing valve 14. Note, the BCDMH output rate remains substantially linear as the water flow rate through the dispensing valve increases. As shown, the BCDMH released into the cooling tower water increases from less than 0.5 lbs. of BCDMH per day to over 1.5 lbs. of BCDMH per day through an increase in the water flow rate through the dispensing valve 14.

Numeral 41 identifies the BCDMH output rate from a second batch of BCDMH particles that cluster within cartridge 20 in the dispensing valve 14. In both tests the initial mass of the BCDMH particles in cartridge 20 were the same and the water flow rates through the dispensing valve 14 were increased by the same amount. Note, with the batch of BCDMH particles that cluster within the cartridge 20 the initial output rate of BCDMH (41) is lower than the initial output rate of BCDMH (40) with the cluster inhibiting BCDMH particles. In addition, identical changes in the main line water flow rate with particles that cluster only increased the BCDMH flow rate output from less than 0.2 lbs. of BCDMH per day to 0.5 lbs. of BCDMH per day (41). Correspondingly, the change in the main line water flow rate through the cluster inhibiting particles resulted in an increase of the BCDMH flow rate output from less than 0.4 lbs. of BCDMH per day to 1.5 lbs. of BCDMH per day (40).

Note, the BCDMH output rate is significantly higher with the batch of cluster inhibiting particles and the BCDMH output rate as a function of increase in the main line flow rate remains substantially linear as the BCDMH flow rate increases from less than 0.5 lbs. of BCDMH per day to over 1.5 lbs. of BCDMH per day.

In one type of system as shown herein the change in the BCDMH delivery rate into the water reservoir may be obtained by manually by adjusting a water flow selector valve 14*f* in the inline dispenser 14. In other types of systems the change in the water flow rate through the dispensing valve may be automated through use of solenoid valves or the like. However, in either case one needs to maintain consistent, repeatable BCDMH output rates from the batch of particles located in the cartridge 20. Since it is preferable to increase the BCDMH output rate through increasing or decreasing the flow rate through the dispensing valve it is important that that the dispensing valve 14 remains calibrated so that the BCDMH output rate of the inline dispensing valve 14 is repeatable as one increases or decreases the water flow rate through the dispensing cartridge 20 in the dispensing valve 14. That is, as the amount of water flowing through the batch of particles in the inline dispensing valve 14 is increased or decreased the BCDMH output rate from the dispensing valve 14 should change accordingly as illustrated by line 40 in FIG. 3.

FIG. 4 shows a sectional open view of water purification cartridge 30 that can be placed in the inline dispenser valve 14. Cartridge 30 is similar to cartridge 20 except cartridge 30 has a downwardly diverging sidewall 31*a* to further enhance the ability of the particles to fall or flow from the top portion 33*b* to the bottom portion 33*a* of the cartridge 30. An example of such a cartridge is shown in Ser. No. 15/530,222 filed Dec. 13. The water purification cartridge 30 contains a batch of particles 19 which are loosely held within the downwardly diverging sides 31*a* and the closed top 31 with the particles having spaces therebetween due to the irregular shape and size of the particles. In this example the water purification cartridge 30 has a dispersant chamber 33 that extends from a top end to a bottom end of the cartridge 30 with the chamber 33 identified as comprising a bottom half 33*a* and a top half 33*b* with a dashed line 33*d* indicating separation between the top portion of the dispenser cartridge chamber 33 and the bottom portion of the dispensing cartridge chamber 33. Located at the top of upper chamber 33*b* is an air pocket 36 as closed top 31 does not permit ingress or egress of air therethrough.

In the embodiment of FIG. 4, bottom water inlet 34 in the water purification cartridge 30 directs a stream of cooling system water into a bottom portion 33*a* of the antimicrobial chamber 33 in the water purification cartridge 30. A water soluble antimicrobial agent in particle form 19 is located in the bottom portion 33*a* and the top portion 33*b* of the antimicrobial chamber 33 wherein the water soluble antimicrobial agent 19 in particle form, that is located in the top portion 33*b* of the antimicrobial chamber 33, gravity feeds to the bottom portion 33*a* of the antimicrobial chamber as water flows through the bottom portion 33*a* of the antimicrobial chamber 33. With this example, the bottom water outlet 39 in the gravity feed water purification cartridge 30 directs water out of the bottom portion 33*a* of the antimicrobial chamber 33 and away from the gravity feed water purification cartridge 30 wherein the antimicrobial agent in particle form 19 comprises a batch of non clustering BCDMH particles. In one example, a linear output was obtained when less than 2.68 percent by weight of the batch of non clustering BCDMH particles would pass through a 20 mesh or when at least 93.72 percent by weight of the batch of non clustering BCDMH particles are sufficiently large so as not to pass through a 20 mesh screen.

FIG. 5 illustrates how a user can replace a spent cooling tower water purification cartridge by removing cover 50 and inserting a fresh cartridge 30 into engagement with the dispensing valve ports 14*c* and 14*d* and thus eliminate hand contact with the BCDMH particles therein.

Tests were conducted to determine the size of granular, unformed BCDMH particles (i.e. BCDMH particles that had not been formed into tablets of regular size or shape) that did not cluster (i.e. cluster inhibiting particles) within a cartridge that is located in an inline dispensing valve. The tests revealed a range of sizes of particles in a batch of BCDMH particles that produced a linear output of BCDMH from an inline dispensing valve by placing a cartridge with a batch of BCDMH particles in an inline dispensing valve and measuring the BCDMH output of the dispensing valve. The BCDMH output (in pounds BCDMH per day) was measured in relation to a change in water flow (in gallons per minute) through the inline dispensing valve. The objective was to determine if the BCDMH output from the inline dispensing valve was linear and repeatable with changes in water flow through the inline dispensing valve. It was found that if the BCDMH particles clustered within the cartridge the BCDMH output was erratic and non linear (i.e. line 41 FIG. 3), however, if the BCDMH particles did not cluster within the cartridge the output was linear and repeatable (i.e. line 40 FIG. 3).

The tests were conducted on cartridges that contained granular BCDMH particles of irregular shapes and sizes. The BCDMH particles tested included a batch of BCDMH particles that included both small BCDMH particles and large BCDMH particles. Tests revealed limits on the smallest size BCDMH particles that produce a linear output. The tests revealed that if small BCDMH particles (i.e., particles that could pass through a 20 mesh screen) were removed from the batch of BCDMH particles leaving a batch of large BCDMH particles (i.e., particles that could not pass through a 20 mesh screen) the BCDMH output from the dispensing valve was linear and repeatable (i.e., line 40 FIG. 3). Tests also revealed if as much as 95% by weight of the BCDMH particles were large particles (i.e., BCDMH particles that could pass through a ½ mesh screen) the BCDMH output from the dispensing valve was linear and repeatable (i.e., line 40 FIG. 3).

The results of tests showing the effect of BCDMH particle size on dispensing valve performance in a closed cycle system using a setup as shown in FIG. 1 where cooling tower water is directed through an inline dispensing valve sold by King Technology is described hereafter.

Test One

Four commercially available Perform-Max™ inline dispensing valves were connected in parallel with the water inlet of each of the inline dispensing valves connected to a water reservoir through a common pipeline. A pump, which was attached to the pipeline, directed water from the water reservoir into each of the Perform Max™ inline dispensing valves. The outlet of each of the four Perform Max™ inline dispensing valves were connected to a return pipeline that redirected the water with the BCDMH therein into the water reservoir.

A cartridge containing a batch of cluster inhibiting BCDMH particles was placed in each of the inline dispensing valves. The particles placed in each of the dispensing valves were taken from a larger batch of BCDMH particles where the particles were sized as follows:

1% by weight of the particles would pass through a 100 mesh screen and 2.68% by weight of the particles would pass through a 20 mesh screen.

In this batch of particles 97.32% by weight of the particles were sufficiently large so that they could not pass through the 20 mesh screen.

During the test the water in the water reservoir was maintained at a pH ranging from 7.2-7.8 with the temperature of the water maintained at 85° F.±1° F.

The test was conducted with three different water flow rates through each of the inline dispensing valves. The first water flow rate through each of the dispensing valves was 2.5 gpm (gallons per minute), the second water flow rate through each of the dispensing valves was 5 gpm and the third water flow rate through each of the dispensing valves was 10 gpm. In each case the water flow rate though the dispensing valve was maintained within 0.5 gpm.

In each case the water circulation rate through a BCDMH cartridge in each of the inline dispensing valves was maintained 24 hours per day.

The pressure at each of the inline dispensing valve was maintained at 7 psi+0.5 psi. The bromine residual in the water was reduced using sodium thiosulfate.

At each of the three different water flow rates through the dispensing valve the output rate of BCDMH in lbs. per day was measured. The BCDMH output rate in lbs. per day was as follows for the cartridge containing the batch of cluster inhibiting BCDMH particles.

At a flow rate of 2.5 gpm through the inline dispensing valves the BCDMH output rate was 0.4 lbs. BCDMH per day.

At a flow rate of 5 gpm through the inline dispensing valves the BCDMH output rate was. 8 lbs. per day.

At a flow rate of 10 gpm through the inline dispensing valves the BCDMH output rate was 1.6 lbs. per day.

Test Two

The test was repeated under the same conditions as in Test One except the BCDMH particle size in the batch was smaller than in Test One. In this example 20.4% by weight of the batch of BCDMH particles were sufficiently small so that they would pass through a 25 mesh screen.

At each flow rate the output rate of BCDMH in lbs. per day was measured.

At a flow rate of 2.5 gpm through the inline dispensing valves with the batch of smaller BCDMH particles the BCDMH output rate was less than 0.1 lbs. of BCDMH per day.

At a flow rate of 5 gpm through the inline dispensing valves with the batch of smaller BCDMH particles the BCDMH output rate was about 0.1 lbs. per day.

At a flow rate of 10 gpm through the inline dispensing valves with the batch of smaller BCDMH particles the BCDMH output rate was 0.5 lbs. per day.

Based on the above tests, it was found that the size of the BCDMH particles in each batch of BCDMH particles had substantially different results even though the mass of the particles in each of the inline dispensing valve was the same. The batch of smaller size BCDMH particles (which had a total larger surface area) had been expected to provide a greater output rate of BCDMH into the body of water than the batch of larger BCDMH particles, since the batch of larger BCDMH particles (described herein as cluster inhibiting water erodible BCDMH particles) would have a total of less surface area in contact with the water than the batch of smaller BCDMH particles (i.e., described herein as clustering particles). However, it was found that for the batch of cluster inhibiting BCDMH particles, the BCDMH output rate was linear and responsive to the manual controls of the inline dispensing valve. In addition, not only was the BCDMH output rate linear and greater with the batch of larger cluster inhibiting BCDMH particles than for the batch of smaller sized BCDMH particles, the BCDMH output rate as a function of the selector valve position remained in calibration as one changed the water flow through the inline dispensing valve.

A further feature of the invention is a method of uniformly increasing or decreasing the BCDMH output in an evaporative cooling and water purification system wherein water is added to the system on the go. As part of the method one directs water into an evaporator 11 having a water inlet 12 for cooling water, a water outlet 15 and a water vapor vent 11*a* from an inline dispenser 14 having a cartridge chamber 21, containing a replaceable cartridge 20 with a dispersant chamber 18 located in the cartridge chamber 21 of the inline dispenser 14. The replaceable cartridge 20 having a first bottom extension port 20*b* mateable with a base port 14*d* in the inline dispenser 14 and a second bottom extension port 20*a* mateable with a base port 14*c* in the inline dispenser 14.

The cartridge as shown in FIG. 2 includes a closed top 20*c* and a sidewall 20*d* diverging from the closed top 20*c* to a bottom 20*f* of dispersant chamber 18, an outlet 20 in fluid communication with the water inlet 12 in the evaporator 11, an inlet 14*b* in fluid commination with the water outlet 15 of the evaporator and a selector valve 14*f* for controlling a flow rate of a stream of water flowing through a first batch of granular BCDMH particles 19 located in a lower bottom chamber 18*a* of the dispersant chamber 18 in the replaceable cartridge 20 with the batch of granular BCDMH particles 19 located in an upper chamber 18*b* of the dispersant chamber 18 having fallen or flowed into the bottom chamber 18*a*. This ensures that BCDMH particles 19 will continually remain in fluid contact with the stream of water flowing into the first bottom extension 14*d* of the first replaceable cartridge 20 and out of the second bottom extension 14*c* of the first replaceable cartridge 20 since BCDMH particles eroded by water flowing therethrough are continually replaced by BCDMH particles falling to the bottom of the cartridge 20. In this example, an increase in a flow rate of the stream of water causes a corresponding increase in a rate of release of BCDMH from the inline dispenser 14 and a decrease in the flow rate of the stream of water causes a corresponding decrease in the rate of release of BCDMH from the inline dispenser 14 as water is periodical added to the system to replace water evaporated from the evaporator 11. However, if BCDMH particles are used that may cluster due to the small size, the output deteriorates as evidenced by line 41 in FIG. 3.

Once the replaceable cartridge with the first batch of granular BCDMH particles has been spent a further replaceable cartridge having a second batch of granular BCDMH particles of the same size as the first batch of granular BCDMH particles can be placed in the inline dispensing valve to allow control of the output of BCDMH from the further replaceable cartridge without having to recalibrate the inline dispensing valve. In one method the cartridge may include either a downwardly diverging sidewall as shown in FIG. 5 or a straight sidewall as shown in FIG. 2. However, as long as the BCDMH particles are of sufficient size to remain flowable into the bottom of the dispersant chamber one can obtain useful repeatable results. A further benefit of the system is that if the replacement cartridge and the original cartridge are filled with the same size BCDMH particles it eliminates the need to recalibrate the inline flow valve each time the cartridge is replaced.

We claim:

1. A cooling tower water purification system comprising:

a flow controllable dispensing valve, wherein water is periodically added to the water purification system as cooling tower water recirculates to and from a cooling tower through the flow controllable dispensing valve, wherein the cooling tower is on a commercial building, and wherein the cooling tower includes an evaporator comprising a water reservoir and a water vapor vent that allows water vapor to escape to atmosphere, the flow controllable dispensing valve being on a recirculation loop in which a line extends from an outlet of the flow controllable dispensing valve to the cooling tower and another line extends from the cooling tower to an inlet of the flow controllable dispensing valve, with the flow controllable dispensing valve including a top that can be removed to expose a cartridge chamber therein;

a replaceable water purification cartridge having a closed top and an antimicrobial chamber with an antimicrobial agent therein that can be inserted into the cartridge chamber in the flow controllable dispensing valve, and the top of the dispensing valve comprises a cover removably positioned to close a top of the cartridge chamber, such that the replaceable cartridge is maintained in a fixed position through engagement with an underside of the cover;

a bottom water inlet in the water purification cartridge for receiving a stream of water from the dispensing valve; and a bottom water outlet in the water purification cartridge for directing the stream of water from the dispensing valve through a portion of the antimicrobial agent, wherein the antimicrobial agent comprises a batch of 1-bromo-3-chloro-5,5-dimethylhydantoin (BCDMH) particles, the batch of BCDMH particles comprising BCDMH particles that are sufficiently large so as not to pass through a 20 mesh screen such that a BCDMH output rate from the dispensing valve remains substantially linear as water flow rate through the dispensing valve changes, so that as the water flow rate through the dispensing valve increases there is a corresponding increase in the BCDMH output rate from the dispensing valve and as the water flow rate through the dispensing valve decreases there is a corresponding decrease in the BCDMH output rate from the dispensing valve, wherein the replaceable cartridge is maintained in the fixed position through engagement with the underside of the cover such that the bottom water inlet and the bottom water outlet of the replaceable cartridge are respectively held in fluid communication with the inlet and outlet of the dispensing valve, wherein the bottom water inlet, the antimicrobial chamber, and the bottom water outlet are configured such that the stream of water received from the dispensing valve into the bottom water inlet is in contact with BCDMH particles of the batch during movement of the stream of water upwardly into the antimicrobial chamber, laterally within the antimicrobial chamber, and downwardly to the bottom water outlet.

2. The cooling tower water purification system of claim 1 wherein less than 0.1 percent by weight of BCDMH particles in the batch of BCDMH particles would pass through a 100 mesh screen and at least 93 percent by weight of BCDMH particles in the batch of BCDMH particles are sufficiently large so as not pass through a 20 mesh screen.

3. The cooling tower water purification system of claim 2 wherein a portion of the batch of BCDMH particles are located in a top portion of the antimicrobial chamber and can gravity feed to a bottom portion of the antimicrobial chamber as water flows through the bottom portion of the antimicrobial chamber to thereby release BCDMH in linear proportion to water flowing through the dispensing valve.

4. The cooling tower water purification system of claim 1 wherein the batch of BCDMH particles consists of the BCDMH particles that are sufficiently large so as not to pass through a 20 mesh screen.

5. An evaporative cooling and water purification system comprising:

an evaporator having a water inlet for cooling water, a water outlet, a water reservoir, and a water vapor vent that allows water vapor to escape to atmosphere, the evaporator being part of a cooling tower on a commercial building;

an inline dispenser having a cartridge chamber, an outlet in fluid communication with the water inlet in the evaporator, an inlet in fluid communication with the water outlet of the evaporator and a selector valve for controlling a flow rate of a stream of water flowing through the inline dispenser, such that the inline dispenser is on a recirculation loop in which a line extends from the outlet of the inline dispenser to the water inlet of the evaporator and another line extends from the water outlet of the evaporator to the inlet of the inline dispenser, and a water source configured to deliver fresh water to the recirculation loop upstream from the inline dispenser such that, when periodically adding water to the system, fresh water from the water source flows through the inline dispenser before reaching the evaporator;

a replaceable cartridge with a dispersant chamber, the replaceable cartridge located in the cartridge chamber of said inline dispenser and having a first bottom extension port mateable with a base port in the inline dispenser and having a second bottom extension port mateable with a further base port in the inline dispenser, the replaceable cartridge having a closed top and a sidewall diverging from said closed top to a bottom portion of said dispersant chamber; and a batch of cluster inhibiting granular 1-bromo-3-chloro-5,5-dimethylhydantoin (BCDMH) particles located in the dispersant chamber in said replaceable cartridge with at least a portion of said batch of granular BCDMH particles in fluid contact with a stream of water flowing into the first bottom extension port of the replaceable cartridge and out of the second bottom extension port of the replaceable cartridge, such that a BCDMH output rate from the inline dispenser remains substantially linear as water flow rate through the inline dispenser changes, so as to provide for an increase in the flow rate of the stream of water correspondingly increasing a rate of release of BCDMH from the inline dispenser and a decrease in the flow rate of the stream of water therethrough correspondingly decreasing the rate of release of BCDMH from the inline dispenser, wherein the first bottom extension port, the dispersant chamber, and the second bottom extension port are configured such that the stream of water is in contact with BCDMH particles of the batch during movement of the stream of water upwardly into the dispersant chamber, laterally within the dispersant chamber, and downwardly to the second bottom extension port.

6. The evaporative cooling and water purification system of claim 5 wherein a linear increase in the flow rate of the stream of water flowing through the inline dispenser produces a linear increase in the rate of release of BCDMH from the inline dispenser.

7. The evaporative cooling and water purification system of claim 5 wherein the batch of granular BCDMH particles consists of BCDMH particles that are sufficiently large so as not to pass through a 20 mesh screen.

8. A method of ridding a cooling tower water system of harmful organisms, wherein water is periodically added to the cooling tower water system, the method comprising the steps of:

a dispensing cartridge having downwardly diverging sidewalls that surround a dispersant chamber in which there is a batch of particles comprising 1-bromo-3-chloro-5,5-dimethylhydantoin (BCDMH) particles;

placing the dispensing cartridge into a dispensing valve having a valve for controlling a flow rate of a stream of water having harmful organisms through the dispensing valve;

directing the stream of water having harmful organisms therein into a bottom inlet of the dispensing cartridge and into the batch of particles and then out of the dispensing cartridge through a bottom outlet of the dispensing cartridge, wherein the bottom inlet, the dispersant chamber, and the bottom outlet are configured such that the stream of water is in contact with BCDMH particles of the batch during movement of the stream of water upwardly into the dispersant chamber, laterally within the dispersant chamber, and downwardly to the bottom outlet;

measuring output rate of BCDMH from the dispensing cartridge as a function of the flow rate of the stream of water through the dispenser; and increasing a size of BCDMH particles in the dispensing cartridge in response to the output rate of BCDMH from the dispensing cartridge being non linear.

9. The method of claim 8 wherein said increasing the size of BCDMH particles is performed such that a least a portion of the BCDMH particles would not pass through a 20 mesh screen.

10. The method of claim 8 wherein, after said increasing the size of BCDMH particles, an amount of the BCDMH particles that would pass through a 20 mesh screen is less than 5.4%.

11. The method of claim 8 wherein said increasing the size of BCDMH particles is performed such that all the BCDMH particles are sufficiently large so as not to pass through a 20 mesh screen.

12. The method of claim 8 wherein said increasing a size of BCDMH particles in the dispensing cartridge increases the output rate of BCDMH from the dispensing cartridge.

13. The method of claim 12 wherein after said increasing a size of BCDMH particles in the dispensing cartridge, the method comprises operating the dispensing cartridge such that the output rate of BCDMH from the dispensing cartridge remains substantially linear as water flow rate through the inline dispenser changes, so that an increase in the flow rate of the stream of water causes a corresponding increase in a rate of release of BCDMH from the inline dispenser and a decrease in the flow rate of the stream of water causes a corresponding decrease in the rate of release of BCDMH from the inline dispenser.

14. A method of uniformly increasing or decreasing BCDMH output in an evaporative cooling and water purification system, wherein water is added to the system on the go, the method comprising:

directing water into an evaporator having a water inlet for cooling water, a water outlet, a water reservoir, and a water vapor vent from an inline dispenser having a cartridge chamber containing a replaceable cartridge with a dispersant chamber, the water vapor vent allowing water vapor to escape to atmosphere, the evaporator being part of a cooling tower on a commercial building, said replaceable cartridge having a first bottom extension port mateable with a base port in the inline dispenser, a second bottom extension port mateable with a base port in the inline dispenser, a closed top and a sidewall diverging from said closed top to a bottom of said dispersant chamber, the inline dispenser having an outlet in fluid communication with the water inlet of the evaporator, and the inline dispenser having an inlet in fluid communication with the water outlet of the evaporator, such that the inline dispenser is on a recirculation loop in which a line extends from the outlet of the inline dispenser to the water inlet of the evaporator and another line extends from the water outlet of the evaporator to the inlet of the inline dispenser, the method comprising operating a water source to deliver fresh water to the recirculation loop upstream from the inline dispenser such that fresh water from the water source flows through the inline dispenser before reaching the evaporator, and the inline dispenser having a selector valve for controlling a flow rate of a stream of water flowing through a first batch of cluster inhibiting granular particles comprising 1-bromo-3-chloro-5,5-dimethylhydantoin (BCDMH) particles located in a lower portion of the dispersant chamber in said replaceable cartridge, with said batch of cluster inhibiting granular particles located in the lower portion of the dispersant chamber being in fluid contact with the stream of water flowing into the first bottom extension port of the replaceable cartridge and out of the second bottom extension port of the replaceable cartridge, such that a BCDMH output rate from the inline dispenser remains substantially linear as water flow rate through the inline dispenser changes, so that an increase in the flow rate of the stream of water causes a corresponding increase in a rate of release of BCDMH from the inline dispenser and a decrease in the flow rate of the stream of water causes a corresponding decrease in the rate of release of BCDMH from the inline dispenser, wherein the first bottom extension port, the dispersant chamber, and the second bottom extension port are configured such that the stream of water is in contact with BCDMH particles of said batch during movement of the stream of water upwardly into the dispersant chamber, laterally within the dispersant chamber, and downwardly to the second bottom extension port, and wherein said operating the water source to deliver fresh water is done periodically to replace water evaporated from said evaporator.

15. The method of claim 14 including a step of replacing the replaceable cartridge with the first batch of cluster inhibiting granular particles with a further replaceable cartridge having a second batch of cluster inhibiting granular particles comprising 1-bromo-3-chloro-5,5-dimethylhydantoin (BCDMH) particles.

16. The method of claim 15 wherein the further replaceable cartridge has a downwardly diverging sidewall.

17. The method of claim 14 including placing the batch of cluster inhibiting granular particles into the replaceable cartridge.

18. The method of claim 14 wherein said batch of cluster inhibiting granular particles comprises BCDMH particles that are sufficiently large so as not to pass through a 20 mesh screen.

19. The method of claim 14 wherein said batch of cluster inhibiting granular particles consists of BCDMH particles that are sufficiently large so as not to pass through a 20 mesh screen.

* * * * *